Dec. 14, 1943.  A. P. KRUPER  2,336,550
COMPENSATING SPECTROPHOTOMETER
Filed May 1, 1943
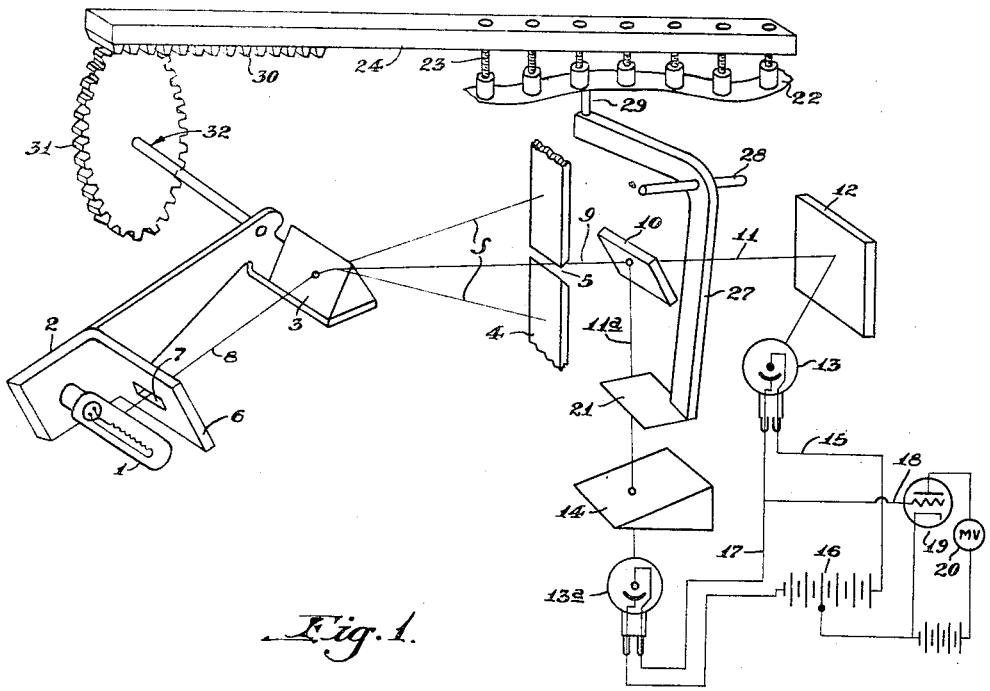
Fig. 1.
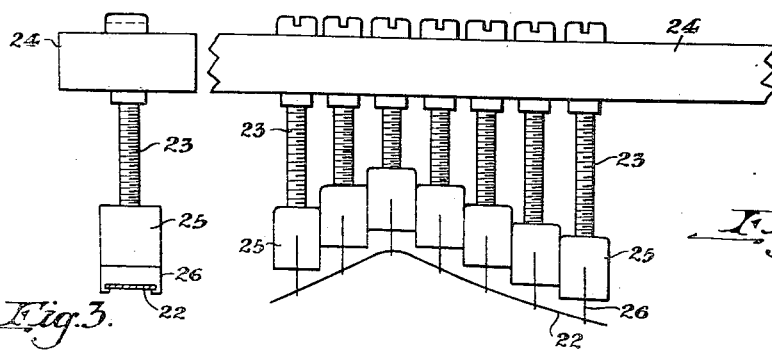
Fig. 2.
Fig. 3.
WITNESSES.
INVENTOR.
ANDREW P. KRUPER.
BY
his ATTORNEYS.

Patented Dec. 14, 1943

2,336,550

UNITED STATES PATENT OFFICE 2,336,550

COMPENSATING SPECTROPHOTOMETER

Andrew P. Kruper, Waterbury, Conn., assignor to Fisher Scientific Company, Pittsburgh, Pa., a corporation of Pennsylvania Application May 1, 1943, Serial No. 485,391

5 Claims. (Cl. 88—14)

This invention relates to means for determining radiant energy characteristics. It relates more particularly to the measurement or determination of the spectral characteristics of materials, especially to spectrophotometric determination of such characteristics as light reflectance, light transmission, and color, and for ease of understanding it will be described with reference to colorimetry.

The underlying principle of spectrophotometry is to compare the effect upon a light-sensitive device caused by a beam of light from the material being tested with the effect produced by a comparison beam. Various types of light-sensitive devices are known but photoelectric cells, sometimes called phototubes or photocells, in which a flow of current is caused or varied by light falling thereon, are commonly used for these purposes. Substantially monochromatic light is generally used for the sample and comparison beams, white light being resolved into the visible spectrum from which substantially monochromatic bands of light are selected progressively from one end of the spectrum to the other, the aforesaid comparison of beam intensities being made at each such band.

A customary practice in spectrophotometric colorimetry is to use a single photocell for measuring the intensity of such monochromatic beams reflected by or transmitted through a sample. The procedure involved in using such a device is laborious and time consuming because it is necessary at each monochromatic band to determine first the effect produced by a reference standard, such as a block of magnesia (MgO) or of magnesium carbonate (MgCO$_3$), and then to replace the standard with the material being investigated, or alternatively to shift the beam from one to the other.

It would be definitely advantageous to make use of two photocells, one of which would continuously be acted upon by the sample beam and the other by the comparison beam, the intensities of the two being balanced easily and quickly by known means. With the comparison photocell acting as the load for the other photocell, such a circuit is of high sensitivity, particularly when examining dense materials or at low levels of illumination. Also, variation in intensity of the light source is automatically compensated in the use of such a circuit, and the only correction needed is between the spectral sensitivities of the photocells. However, such circuits have not been generally used because of the impossibility of obtaining photocells whose spectral sensitivities are matched and whose outputs will remain constant over a period of time. Moreover, differences in selective absorption in the optical paths to the two cells may occur, which is disadvantageous.

It is among the objects of this invention to provide a means for determining radiant energy characteristics, particularly spectral characteristics of materials, by means of circuits embodying two devices which are influenced by light to generate or vary a flow of current, such as photocells, in which differences in spectral sensitivity of the light-sensitive devices and in selective absorption in their optical paths are automatically compensated, which is simple, and which embodies the advantages of such circuits but overcomes the disadvantages to which they have been subject.

Another object is to provide an apparatus which embodies advantages just stated, is simple, easily constructed and used, is sturdy and reliable, and the cost of which is not substantially greater than that of a similar apparatus not constructed in accordance with the invention.

A special object is to provide an apparatus for spectrophotometric colorimetry which embodies the foregoing objects.

Other objects will appear from the following description.

The invention may be described with reference to the accompanying drawing in which Fig. 1 is a schematic view of a known form of spectrophotometer and spectrophotometer circuit modified in accordance with the preferred embodiment of the invention; Fig. 2 a fragmentary view on an enlarged scale of the adjustable cam member shown in Fig. 1; and Fig. 3 an end view of the cam.

Having reference to Fig. 1, the spectrophotometer shown includes a conventional light source 1, such as a ribbon filament incandescent bulb, which is mounted upon a base member 2 which likewise carries a light-resolving device, such as a prism 3, adapted to disperse light from source 1 to the visible spectrum indicated schematically as being projected between the lines S upon a plate member 4 provided with a slit 5. Mounted upon base 2 is a plate member 6 having a slit 7 which directs a beam of light 8 from source 1 to the prism 3. Base member 2 is mounted to swing about one end, which corresponds to the axis through the prism, as shown, so that rotation of prism 3 about this axis shifts the position of the spectrum S relative to slit 5. Slit 5 is of such width as to pass a narrow band 9 of monochromatic light from spectrum S, and by rotation of the prism it is therefore possible to cause the wave length range of band 9 to shift progressively from one end of the spectrum to the other, which is commonly referred to as scanning.

Beam 9 impinges upon means for dividing it into two beams of monochromatic light. A half-silvered mirror 10 is shown for this purpose although other devices functioning similarly might be used. Mirror 10 passes a portion of band 9 as a beam 11 to a reference standard or sample 12 from which it is reflected to a photocell 13. The remainder of beam 9 passes from the mirror as a beam 11a through a calibrated light-metering device 14 and falls upon another photocell 13a. Although an optical wedge is shown as the light-metering device, those familiar with the art will understand that other devices, such as iris diaphragms, polarizing prisms, sector disks and others might be used for this purpose.

The photocells 13 and 13a are connected in a circuit so that one acts as the load for the other. Thus, a conductor 15 connects the anode of photocell 13 through a battery 16 to the cathode of photocell 13a, the anode of the latter cell being connected by a conductor 17 to the cathode of cell 13. The circuit is connected as shown to the grid 18 of a three-electrode amplifier tube 19 the plate circuit of which contains a null indicating instrument such as a galvanometer 20. When both photocells are completely in the dark, galvanometer 20 reads some arbitrary value, which represents balance of the photocell circuit. Hence the galvanometer will read this same value when the two photocells are illuminated with equal amounts of energy.

In the use of a spectrophotometer of the foregoing type a standard sample 12 is used first mounted as shown and the light-metering device is set at some arbitrary value, usually at 100 per cent transmission, and the ratio of the intensities of the beams 11 and 11a is adjusted by a vane 21 interposed into one of the beams to bring their intensities to equality as indicated by galvanometer 20 reading the same as when the photocells were in the dark. The sample to be investigated is then substituted at 12 and the light-metering mmeber 14 is adjusted so that the outputs of the two photocells will again be equal, which is shown by the galvanometer reading the same as above, which is called a balance reading. The amount of adjustment of wedge 14 necessary for this purpose then represents the characteristic of the sample for the particular wave length of band 9. This procedure is then repeated by scanning the spectrum.

Owing to the fact that the photocells are not of matched sensitivity over the visible spectrum, and to the fact that at different wave lengths there may be differences in selective absorption in the optical paths of the sample beam 11 and the comparison beam 11a, it is necessary in the use of such a spectrophotometer to balance the two photocells against the reference standard at each wave length used in scanning the spectrum, in order to obtain accurate data representing the spectral characteristics of the sample. Obviously this is objectionable because it is necessary to repeat the entire procedure for each step of the scanning.

The objects of the present invention are attained by providing a cam having an adjustable surface which acts upon the vane 21 or equivalent light-interrupting means to regulate the intensity of either the sample beam or the reference beam in such manner that differences in the spectral sensitivities of the two photocells and in selective absorption in their optical paths are compensated for over the entire spectrum, i. e., so that the outputs of the two cells relative to a reference standard are balanced over the range of the spectrum which is scanned. Accordingly, when the cam surface has been adjusted to produce that result the readings of the light-metering device represent a true comparison between the intensities of the sample beam and the reference beam over the entire spectrum so that scanning of the sample is possible without the necessity of interrupting at each change of wave band to bring the cells into balance against the standard.

Although an adjustable cam in accordance with my invention may be constructed and operated in various ways, the embodiment preferred at present is shown in the drawing. It comprises a tape, or ribbon, member 22, most suitably of metal, to the upper surface of which there are connected at regular intervals screw members 23 mounted in a bar 24 so that by rotating screws 23 the contour of strip 22 can be adjusted according to need. In the embodiment shown the lower ends of the screws 23 turn in blocks 25 from each of which there projects a yoke 26 which grasps tape 22 and through which the tape may slide.

The greater the number of screws 23 the more closely the cam can be adjusted to the desired shape. I have found, however, that for all practical purposes the use of 31 such screws suffices for scanning the spectrum from 4,000 to 7,000 Angstrom units, which is the range commonly used for colorimetry. With such a spacing the cam surface can be adjusted for every 100 Angstrom units of wave length. Of course, a greater or a fewer number of adjustment points may be used without departing from the invention.

In the embodiment shown vane 21 is mounted upon one end of a rocker-arm 27 pivotally mounted at 28 so that the vane can be moved into or out of comparison beam 11a. The other end of the rocker-arm is provided with a finger 29 which contacts the cam surface so that the rocker-arm is movable in accordance with the contour of the cam surface. At its extended end bar 24 is provided with a rack 30 for engagement by a pinion 31 which is rotated in conformity with the movement of base 2 about the axis 32. Thus as the prism is rotated in the scanning operation about the axis 32, the pinion 31 which is attached to the axis shaft 32 will act upon rack 30 to move the cam surface backwardly or forwardly, as the case may be, and to actuate vane 21 accordingly.

In the use of a spectrophotometer as provided by this invention a standard sample is mounted at 12 and the base 2 rotated about axis 32 to bring one end of the spectrum to slit 5. This will automatically bring one end of the cam over pin 29. The light-metering wedge 14 is set at 100 per cent transmission and the screw 23 immediately over pin 29 is then rotated to move vane 21 into or out of comparison beam 11a until the intensities of the beams 11 and 11a are equalized as indicated by balance of the galvanometer 20. Base 2 is then rotated to bring another narrow band of wave lengths 9 opposite slit 5, which will automatically bring the cam to a new position, and a new screw now over pin 29 is rotated as before. This procedure is repeated step by step over the entire spectrum. When that has been accomplished the cam surface, or contour, will be such that at any wave length of the spectrum the differences in spectral sensitivities of the cells and of selective absorption in their optical paths will be automatically compensated by the action of the cam upon the light-interrupting vane. The instrument is then ready for examination of a sample, which replaces the standard at 12, and because of the compensating action of the cam it is possible to scan the sample continuously over the entire spectrum without interruption.

I have found that having thus adjusted the cam surface satisfactory results are to be had over extended periods of time, such as throughout a working day, without further adjustment, and usually only slight readjustment is necessary, using the reference standard, when the instrument is used at a later time. The invention therefore greatly simplifies and shortens spectrophotometric analysis with a circuit of two photocells, and eliminates to a large extent the tedium that has attended the use of such circuits prior to my invention.

Although the invention has been described and illustrated with particular reference to the determination of reflectance it will be understood that it is applicable generally in the field of spectrophotometry, for example, for determination of transmission characteristics, as well as for measuring radiant energy generally. Also, while in the embodiment shown the cam actuates a vane, it may be used to actuate other forms of light-interrupting devices, and various forms of other elements may be used. For instance, a diffraction grating may be used in place of prism 3, and the optical wedge 14 could be replaced by a polarizer and analyzer prism. In the latter case the vane 21 could be replaced by another polarizing prism mounted thereabove for rotation under the action of the cam so as to increase or decrease the intensity of the beam 11a when it falls upon the photocell 13a. Similarly, any of the well-known types of amplifier circuits may be used, and the galvanometer 20 can be replaced or supplemented by recording means. Again, instead of operating a light-interrupting means the cam which characterizes the present invention can be used to actuate electrical controls in the photocell circuit for achieving equality of cell output. And where light-interrupting means such as the vane 21 are used it may be mounted to act either in the sample beam 11 or the comparison beam 11a.

The utility of the instruments provided by the invention may be further extended by combining with them the invention disclosed and claimed in my copending application, Serial No. 485,393, filed May 1, 1943. As disclosed therein, the reliability of such a circuit may be affected by the photocell dark current, particularly when the photocells are operated in the dark or at low energy levels. Under such circumstances the internal resistances of the photocells become so high that slight changes in their dark currents will cause very large responses of the null instrument. This effect can be masked by exposing the photocells during use to radiant energy at a level which suffices to prevent the internal resistance from becoming great enough to be appreciably affected by changes of the dark current, but which is low enough not to reduce substantially the sensitivity of the circuit. For most purposes, flash light bulbs operated at the threshold of incandescence suffice, one such bulb being mounted adjacent each photocell to direct radiant energy thereon. Preferably, such bulbs are operated from a common battery. This subject matter is not claimed herein.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. Apparatus for measuring the spectral properties of a material comprising a polychromatic light source, means for resolving light from said source into the visible spectrum, means for selecting bands of substantially monochromatic light progressively from one end of the spectrum to the other, a pair of photocells and electrical connections between them, a light-metering means associated with one of said photocells, means for separating said band into two beams and passing one of them through said light-metering means to one of said photocells and the other to said material and thence to the other of said photocells, means independent of said light-metering means for regulating the intensity of one of said beams, a cam operatively associated with said light-regulating means and having its operative surface adjustable to actuate said regulating means to alter the intensity of the beam at any point of the spectrum and thereby to compensate for differences in spectral sensitivity of the photocells and in selective absorption occurring in their optical paths, and means operatively associated with said cam and said selecting means to move said cam in synchronism with the movement of said band over the spectrum.

2. Apparatus for measuring the spectral properties of a material comprising a polychromatic light source, a member provided with a slit for passing a narrow wave length band of light, means for resolving light from said source to form a visible spectrum in the plane of said slit and movable to shift the spectrum over said slit, an electrical circuit including a pair of photocells, a light-metering means associated with one of said photocells, means for separating said band into two beams and passing one of them through said light-metering means to one of said photocells and the other to said material and thence to the other of said photocells, means independent of said light-metering means associated with one of said beams for regulating its intensity, a cam mounted to actuate said light-regulating means and having its operative surface adjustable to actuate said regulating means to alter the intensity of the beam at any point of the spectrum and thereby to compensate for differences in spectral sensitivity of the photocells and in selective absorption occurring in their optical paths, and means acting between said cam and light-resolving means to move the cam in synchronism with the shifting of the spectrum relative to said slit.

3. Apparatus according to claim 2, said light-regulating means being a vane mounted for movement into and out of the beam.

4. Apparatus for measuring the spectral properties of a material comprising a polychromatic light source, a member provided with a slit for passing a narrow wave length band of light, means for resolving light from said source into a visible spectrum in the plane of said slit and movable to shift the spectrum over the slit, an electric circuit including a pair of photocells connected so that one acts as the load for the other, a light-metering means associated with one of said photocells, means for separating said band into two beams and passing one of them through said light-metering means to one of said photocells, and the other to said material and thence to the other of said photocells, a light-interrupting device mounted for adjustable movement into and out of the path of one of said beams, a cam mounted to actuate said light-interrupting device and having its operative surface adjustable to actuate said light-interrupting device to alter the intensity of the beam at any point of the spectrum and thereby to compensate for differences in spectral sensitivity of the photocells and in selective absorption occurring in their optical paths, and means operatively connecting said cam and light-resolving means to move the cam synchronously with spectrum shifting movement of the resolving means.

5. Apparatus according to claim 4, said light-interrupting device acting upon the comparison beam which passes through said metering means.

ANDREW P. KRUPER.